United States Patent
Gelb et al.

(10) Patent No.: US 7,562,093 B2
(45) Date of Patent: *Jul. 14, 2009

(54) METHOD FOR CREATING A STORED QUERY

(75) Inventors: Elizabeth A Gelb, Summit, NJ (US); Eric D Whitney, Delaware, OH (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/861,913

(22) Filed: Sep. 26, 2007

(65) Prior Publication Data

US 2008/0027952 A1   Jan. 31, 2008

Related U.S. Application Data

(62) Division of application No. 10/260,806, filed on Sep. 30, 2002, now Pat. No. 7,421,442.

(60) Provisional application No. 60/393,207, filed on Jul. 2, 2002.

(51) Int. Cl.
   *G06F 17/30* (2006.01)
(52) U.S. Cl. ...................... 707/102; 707/100
(58) Field of Classification Search ............... 707/102; 705/34

See application file for complete search history.

(56) References Cited

U.S. PATENT DOCUMENTS

| | | | |
|---|---|---|---|
| 5,555,403 A | 9/1996 | Cambot et al. | |
| 5,664,173 A * | 9/1997 | Fast | 707/4 |
| 6,185,567 B1 | 2/2001 | Ratnaraj et al. | |
| 6,247,008 B1 | 6/2001 | Cambot et al. | |
| 6,633,875 B2 | 10/2003 | Brady | |
| 6,694,321 B1 * | 2/2004 | Berno | 707/101 |
| 6,775,665 B1 | 8/2004 | Piersol | |
| 7,031,956 B1 * | 4/2006 | Lee et al. | 707/3 |
| 7,058,600 B1 * | 6/2006 | Combar et al. | 705/34 |
| 7,117,529 B1 * | 10/2006 | O'Donnell et al. | 726/6 |
| 7,421,442 B2 * | 9/2008 | Gelb et al. | 707/102 |
| 2003/0126114 A1 | 7/2003 | Tedesco | |
| 2004/0003241 A1 * | 1/2004 | Sengodan et al. | 713/168 |

\* cited by examiner

*Primary Examiner*—Don Wong
*Assistant Examiner*—Sheree N Brown
(74) *Attorney, Agent, or Firm*—Snell & Wilmer L.L.P.

(57) ABSTRACT

A database system includes an intermediary program that provides a variety of functions. Logging on to the intermediary program results in log-in information being transmitted from an encrypted file to the database system via the intermediary program. The database system includes the ability for the user to enter criteria for a query in a variety of different manners, including the ability to directly modify generated SQL statements and the ability to use input lists in creating queries. In addition, the queries entered by the user can be stored in a separate database, such that the efficiency and operation of the database system can be improved. In addition, the delivery of query results and reports allows for delivery of files that are associated with a data period in any format and also allows the user to receive multiple reports in a single, compressed file.

18 Claims, 7 Drawing Sheets iWeb Tools - Query Editor

The WHERE Column Item (Advanced Query Only)

502 — ☐ OR?

504 — Data Item | Activated Date (335) ▼

506 — Data Type | smalldatetime ▼

508 — Operator | >= ▼

510 — Value | 1/1/2002

512 — Data Item | None (0) ▼

Left Parenthesis 514 — | 0    Right Parenthesis 516 — | 0
Count                                 Count 518 — ☐ Edit SQL?

520 — SQL | AND cu.activated >= '1/1/2002'

New | Edit | ☐ All Users

List

FIG. 5

METHOD FOR CREATING A STORED QUERY

CROSS-REFERENCE TO RELATED APPLICATIONS

This application is a divisional of U.S. patent application Ser. No. 10/260,806 entitled "SYSTEM AND METHOD FOR DATA CAPTURE AND REPORTING", filed on Sep. 30, 2002, and which application claims priority to and the benefit of U.S. Provisional Application Ser. No. 60/393,207, filed Jul. 2, 2002, all of which are incorporated herein by reference.

FIELD OF INVENTION

This application generally relates to a system for data capture and reporting. More particularly, this application relates to a method and system for remotely accessing, querying, and reporting from a centralized database.

BACKGROUND OF THE INVENTION

A number of different people or entities may desire to access information in databases. Various types of data may be important to a number of people such as, for example, sales data for a merchant, account information for a brokerage, bank, or credit card company, and/or the like. Organizing the large amounts of data that may exist, presenting the data in a predetermined, easy-to-use format, and facilitating various searches on the data is often desirable.

Data stored in a database may be organized into various fields, each of which stores an item of data. For example, a database may store account data, with an account number stored in one field, an account balance in another field, and various user identification information stored in other fields. In a relational database, there may be several tables storing related data, obviating the need for redundant data within a table. For example, in a single database, one table may store account data, such as an account number, account balance, and a social security number. Another table may contain sales data for all transactions by all account holders. A third table may contain user information, such as a name, address, and social security number, for each user. By joining the three tables in a single database, one can determine all the transactions performed by a certain account holder, and the name and address of that account holder, without having to store the name and address information for the user in each transaction.

When a user desires to view or analyze the data, the user may not want to view raw data. Instead, the user may desire to view the data in a more readable format, such as a spreadsheet-type format, for example. Such a format may be more readable because it only contains a selected number of the fields within the tables of the database. In addition, the data may be sorted to present the data in a manner more useful to the user. In addition, the user may only desire to view certain data. As such, a user may run a query on the database which is a request for certain data. A query contains a list of criteria that data must meet. For example, if a user wishes to view sales data for sales greater than $10,000, a query can be input that indicates such a limitation. The query is then executed and all the requested data is located and output to the user. The data may be presented to the user in various forms, such as a report. A report may contain the results of a query presented in a formatted output suitable for printing or otherwise displaying. A common method of querying databases is the use of Structured Query Language ("SQL"), available in products such as Microsoft SQL Server and MySQL.

Previously, such databases were only available for use by users at specific, predetermined locations. However, with the proliferation of the Internet and the corresponding worldwide networking of computers, it has become desirable to allow geographically diverse entities to access databases by using a traditional web browser interface or other custom interface, transmitting data via the Internet. However, previous methods and systems for providing such access suffered from a variety of drawbacks. For example, some systems provide a means for a secure connection; however, a user may be able to access the system by using other direct methods, which may not be desirable. In addition, troubleshooting the system may be difficult due to the varying configurations of the various possible configurations of user's computers. Furthermore, previous systems suffered from various drawbacks in the integration of querying and reporting. There is a desire for a more robust solution to remotely access databases that solves the problems described above. There is also a desire to provide a more robust front-end functionality to database interface programs.

SUMMARY OF THE INVENTION

A system and method for accessing a secure system is disclosed. A user is able to access a central program through the use of an intermediary system. The intermediary system receives log on information from the user and validates the log on information to ensure the user is authorized. If the log on information is correct, the access data used to access the secure system is obtained from a separate file. This file may be encrypted such that a user is unable to view the access data. This access data is then transmitted to the secure system. The secure system validates the access data, then allows access to the user through the intermediary system.

A method for executing a database query is also disclosed. A user creates a query using a variety of methods, such as a graphical method. A database system then generates an SQL statement that represents the query entered by the user and displays the SQL statement to the user. The user is then able to directly manipulate the SQL statement by editing, adding, deleting, etc. elements to the SQL statement. The modified SQL statement is then validated to ensure that the SQL statement is valid and meets the requirements for SQL statements. Thereafter, the SQL statement is executed. The results of the SQL statement execution may be made available to the user in a variety of different manners.

Results of a query may stored in a file of a predetermined format. The file may be delivered by categorizing the file such that can be made available to a pre-determined group of users. Then the file is placed in a location that is accessible to the pre-determined group of users. Such a location may be, for example, a specific Internet location. From that location, users may be able to download the file. In addition, multiple files may be made available after being compressed and placed in a separate file.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

FIG. 5 is a flowchart illustrating the operation of a validation process;

DETAILED DESCRIPTION

The present invention may be described herein in terms of various functional components and various processing steps. It should be appreciated that such functional components may be realized by a variety of different hardware or structural components configured to perform the specified functions. For purposes of illustration only, exemplary embodiments of the present invention will be described herein. Further, it should be noted that, while various components may be suitably coupled or connected to other components, such connections and couplings may be realized by a direct connection between components, or by a connection through other components and devices.

Figure 1:
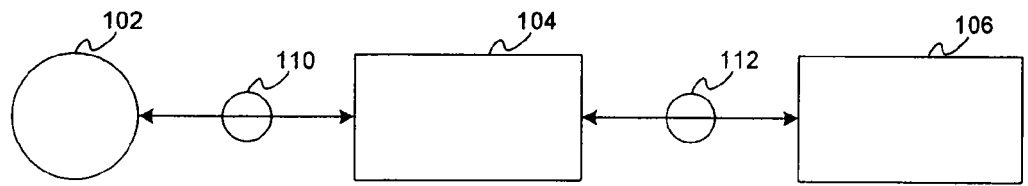
FIG. 1 illustrates block diagram of an exemplary database system.

In certain systems, a user may desire to access a central computing system remotely. The access to the central computing system may be through an intermediary component. For security purposes, both the intermediary component and the central computing system may be configured with password protection, such as a user name and a password associated with the user name. For example, with reference to the block diagram of FIG. 1, a database system that can be utilized to perform an exemplary method is illustrated. A user 102 may wish to access data stored in a centralized database 106. However, there may be an intermediary program 104 that is to be used by those accessing the data stored in database 106. Intermediary program 104 may be a "front-end" that makes it easier for users to execute various queries, obtain reports, etc. Intermediary program 104 may be configured to display only a portion of the available fields and may be configured to not allow the modification of data within the database by making the data read-only.

Intermediary program 104 may be configured to connect to database 106 in the following manner. A user is given a first user id and password 110 that is used to access intermediary program 104. Such an access can occur through the use of a variety of different devices, Such as through a personal computer, laptop computer, personal digital assistant ("PDA"), a cellular phone with data communication capabilities, or the like. In an embodiment using personal computers, intermediary program 104 may be a program stored locally on the user's computer. In another embodiment, intermediary program 104 may be accessible through the use of an Internet web browser, such as Microsoft Internet Explorer or Netscape Navigator. Intermediary program accesses database 106 through the use of a second user name and password (112). Intermediary program 104 may allow various functions, such as browsing, querying, and reporting, to be performed on database 106. Intermediary program 104 may be configured to not allow changes to the structure of the various tables of the database. In addition, intermediary program 104 may be configured to not allow changes to the data contained within the database. Intermediary program 104 may be configured to use buttons, pull-down menus, hyperlinks, and the like, to allow the user to select the function he wishes to perform. If a user selects a report, for example, intermediary program 104 may be configured to display the reports available for viewing by that user. Intermediary program 104 thus performs a variety of different functions and is sometimes called a "front-end." A database administrator may prefer that access be made available to users solely through the use of the front-end, without allowing direct access to the database. However, if the user knows the second user name and password (112) for directly accessing database 106, a user may bypass intermediary program 104 to directly access database 106. Direct access to database 106 may result in unwanted changes to database 106, such as changes to the data and changes to the structure of database 106. Such direct access to database 106 may not be desirable.

In order to prevent such direct access to database 106, one aspect of the invention is the use of CON files for log on functions. The log on information needed to access database 106 is not available to the user. The user logs on to intermediary program 104, then intermediary program 104 performs the log on process to the database, through the use of a second user name and password (112), without making the user aware of second user name and password 112.

Second user name 112 may be contained in an encrypted file stored locally on the user's computer in a connection file ("CON file"). The CON file may be configured to contain the information needed to log-in to a variety of different applications. Using such a CON file, the user may be able to access various different, restricted access applications using the data stored in the single encrypted CON file. Because the CON file is encrypted, the user need not be made aware of the second user name and password 112.

A method for secure access to a central system may include the following steps. The user is granted a unique user id and password for logging-on to the secure, central system, but the user is not given this information, which is encrypted and stored into a CON file. Instead, the user is provided with a different unique user id and password for logging on to an intermediary program. Such a user id and password may be one selected by the user. In another embodiment, the user id and/or password may be assigned by the intermediary program or by the central system. The intermediary program stores the unique id and password for logging on to the secure system. This information is encrypted and stored in a CON file such that the information is not readily accessible to the user. The CON file may be stored locally on the user's computer or centrally at the location of the secure system.

Figure 2:
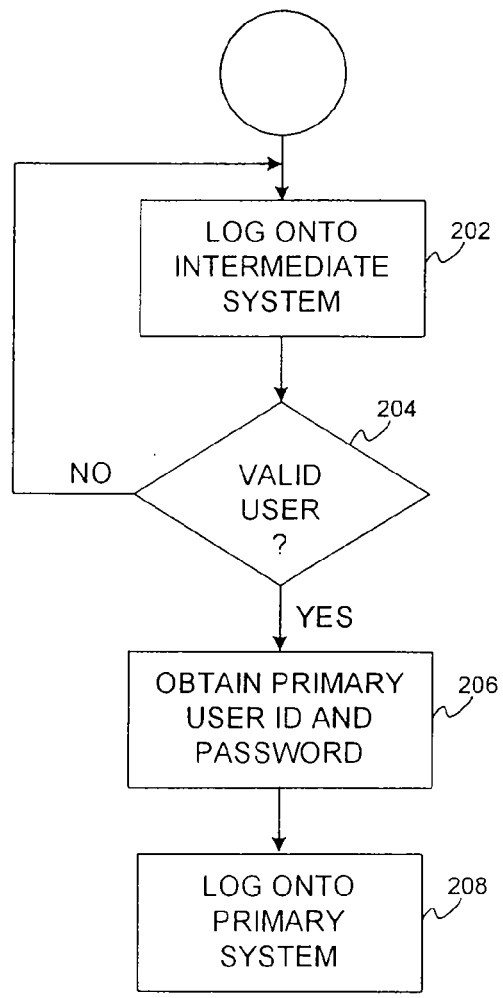
FIG. 2 is a flowchart illustrating a method of logging on to a secure system.

Thereafter, when the user wishes to access the secure system, the user performs the following steps, with reference to FIG. 2. The user logs on to the intermediary system by entering his user name and password (110) for the intermediary system (step 202). The intermediary system then controls and/or facilitates the logging on process to database 106. The intermediary program determines if the user id and password are valid by determining if the entered data is correct (step 204). If valid, then intermediary program 104 obtains the second user name and password (112) from the CON file (step 206). The intermediary program then performs various log-on steps to access database 106, such as transmitting the second user id and password (112) to the primary system for validation (step 208). Thus, while the user is able to access database 106, the user is not able to directly log on to the secure system as user name and password (112), which is needed to log-on to database 106, is unknown to the user.

It should be understood that the order of operations may be changed. For example, the intermediary program may obtain access data from the separate file and transmit the access data to the secure system before receiving log on information from the user.

In other embodiments, the secondary ID and password feature can be extended to apply to a variety of different applications. For example, mobile computing is becoming more prevalent, for example, with respect to the impending release of the next generation of cellular phone technology. As such, there is more of a desire to access remote locations using, for example, a laptop computer or personal digital assistant ("PDA") or the like coupled to a cellular phone or using another communications device. In order to prevent users of such devices from logging in and having greater access than desired, an embodiment of the above-described method may be used to allow access to an intermediary system without allowing direct access to a primary system.

The above-described system and method may also be used in situations where an application uses its own internal user profiles to authenticate a user. Such an application may use shared proxy accounts for underlying intra-application connections, such as between a client-side application and one or more database servers, where it may be undesirable for the actual low-level connection information to be available to the client users.

An additional aspect of the present invention is the ability to run queries on the data within the database. A query is a request by a user for specific data. In a typical database system, a user performs a query by requesting data that meets certain criteria. The criteria may be relatively simple, such as requesting all data from a particular time period, to very complex criteria that involves restrictions to numerous fields.

In database systems of the prior art, when a user created a query, the requested data was typically retrieved for use by the user that entered the query. If another user wished to request the same data, or if the same user wished to run the query again, he would have to re-enter all of the elements of the entire query. This resulted in several problems. The re-entering of query requests may become time consuming, especially in the case of relatively complex queries. In addition, the troubleshooting of queries may be difficult because one who troubleshoots could become responsible for testing on a variety of different types of computing platforms in order to adequately discover the problems being encountered by the various users.

To solve the above-described problem, another aspect of the present invention involves the manner in which the queries are executed and stored. Queries may be configured to execute solely within the central server, as opposed to being executed on the user's computer. In such a manner, the queries are run on a single, common platform that can be more easily subjected to troubleshooting should there be errors in the queries. In addition, queries also may be saved to a central database. Saving queries to a central database enables other users to run the same query again by merely retrieving the previously saved query. Furthermore, a user can make small modifications to the query more easily by retrieving a saved query and making modifications, as opposed to having to create a query from the beginning. Furthermore, all query profiles, at any stage of development, are easily accessible for system administrators and other support personnel. By virtue of the central storage, all queries can be backed up with the contents of the database, ensuring a regular backup schedule for entered queries. Such a central storage of queries also results in the elimination of queries that are dependent upon certain data residing on user computers.

This aspect of the invention operates in the following manner. A user may enter various elements of a query for various fields of a database. For example, entering the name "Smith" in a last name field will find accounts belonging to people whose last name is Smith. Other criteria can be entered in a similar manner. Once the user has defined all the desired criteria, the user can execute the query. Upon the execution of the query, the various elements of the criteria can be saved in a separate database, stored centrally. In addition, the query can be saved to the separate, central database before execution, even before all of the elements of the query are finalized. To access such a feature, there may be a menu choice or a push button that allows the user to select a save command. Thereafter, various information regarding the query (such as the fields and criteria of the query) can be stored. The storage of the elements of a query may be accomplished through the use of an SQL statement such as INSERT into a pre-existing database or through the creation of a database or through various other methods known in the art.

In addition to the storage of query itself, various performance information can also be stored in a similar manner. In such a manner, the performance of queries can be tracked and analyzed. Through such an analysis, one may be able determine the performance of queries on certain fields. In addition, one can determine which fields within a database are being used in queries most often, and what fields are used in queries least often. The queries being run are an indication of how the database is being used. The database can then be modified to more efficiently operated based on the usage and performance of the database. For example, if it is found that no queries are run on a particular field, that field may be eliminated from the database if it is not otherwise necessary.

A query may be entered into the database system through various methods. For example, a graphical user interface may be present to allow the entry of query elements through the use of pop-up lists, radio buttons, check boxes, and the like, a user may be able to select certain fields upon which to run a query. A user may also be able to enter in the criteria for the field. For example, a user may select a date field and then enter a date for which records should be pulled. In addition a user may be able to enter operators to clarify how the criteria are to be used. For example, with reference to a date field, a user may be able to select such that the records retrieved are after a specific date, before a specific date, or equal to a date. Similarly, a user may enter similar operators with reference to a numeric field. A user may also be able to use wildcard characters in order to search for various forms of words.

In addition, an embodiment of the present invention is "data period aware." In other words, the output generated by the execution of a query can be customized for each data period. In many database systems, data is updated at regular intervals. For example, certain data may be updated monthly while other pieces of data are updated weekly. An embodiment of the present invention may be configured such that queries on data that are updated monthly is uniquely associated with that data period. Typically, when the same query is run a second time, the query results are overwritten. However, if a query is run again, but with newly updated data, the previous results of the query can be preserved.

For example, sales data may be updated monthly. When a user runs a query on July 2002 data, the results may be stored in a particular file. If a user runs the same query on July 2002 data again, the results may be overwritten. However, if the user runs the same query on August 2002 data, the results from the July 2002 data are not overwritten and remain available for future use. The query on the August 2002 data is stored in a separate file.

Another aspect of the present invention is the use of Input Lists. When performing a query, a user typically requests data that meets certain criteria. For example, requesting all sales data where the state of the sale is CA. However, a user may request more data that is not as simple to enter. For example, requesting sales data where the state of sale is one of the following: AZ, CA, NV, WA, OR, AK, HI, ID, or MT or sales data from a selection of 50 different ZIP codes. In some instances, a user may wish to run various queries on such groupings on a regular basis.

In such a situation, a user may use Input Lists. An Input List provides a user with the ability to upload their own custom lists of certain types of information that they may then incorporate as a query criteria. For example, a user may define an Input List containing the states AZ, CA, NV, WA, OR, AK, HI, ID, and MT. Thereafter, when the user wishes to run a query with that criteria, the user can refer to the Input List in lieu of having to enter all the items in the criteria. Such an input list can be of various levels of complexity, from a list of a few pieces of data, such as that described above, to a complex, nested statement that may involve several levels of searching of a table or database. In such a manner, the input list may serve as an extension of the database by providing the user with the ability to upload files that may be used in conjunction with the database to produce an output that includes both data from the central database and data from the input list.

Figure 8:
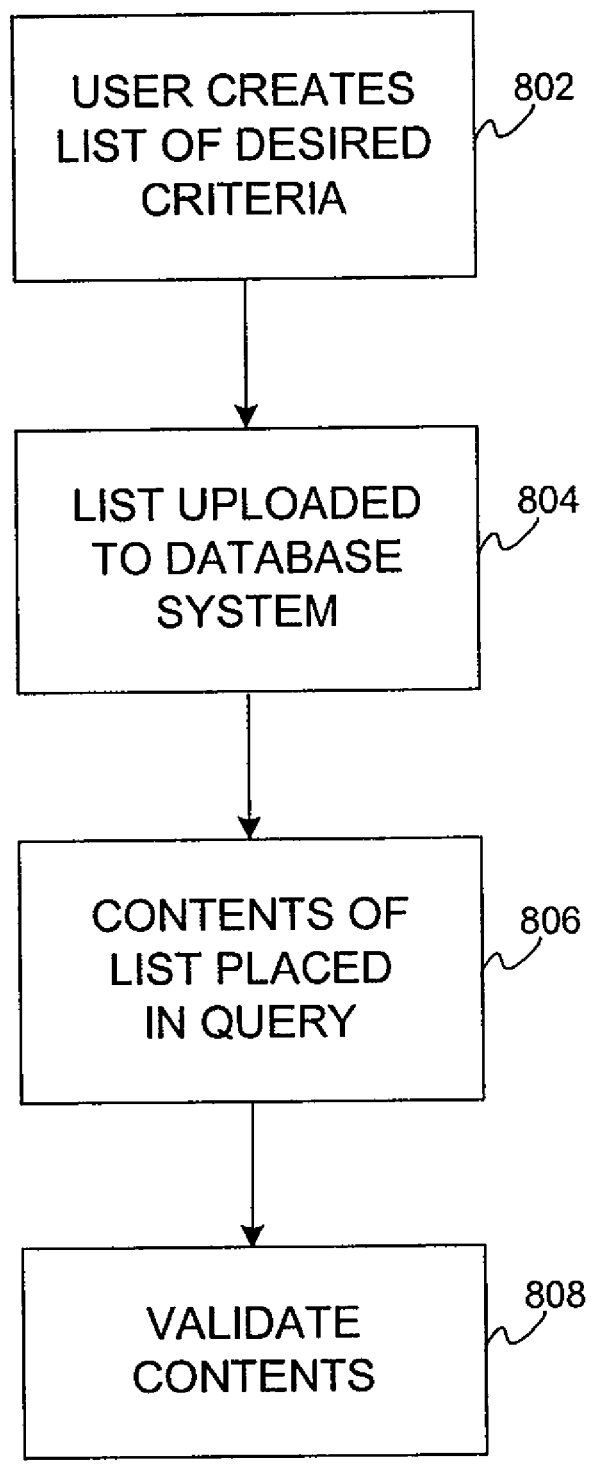
FIG. 8 is a flowchart illustrating the operation of an Input List.

With reference to FIG. 8, an Input List may be used in the following manner. A user creates an input list containing the desired criteria of a field in a database (step 802). This list may be stored on the user's computer. In the alternative, the list can be stored centrally in the database, associated with the user's log on information. When the user is creating a query, the user selects the input list and uploads the contents of the input list to the query (step 804). The list may be in a variety of formats, including the DBF format and ASCII text format. Thereafter, the contents of the list are entered into the appropriate field of the query and the user can commence with running the query or modifying various other fields of the query (step 806). This step may involve converting the data from the stored format (such as DBF or ASCII) into the query screen which may involve the use of SQL to enter the contents of the Input List into the query field. In an embodiment using an HTTP interface, the data may be converted into a compatible format to be transmitted to the central database. The contents of the input list may then be checked to ensure it contains valid data (step 808). For example, if the query field is numeric, it may not accept text information. In addition, duplicate information may be detected and eliminated. Thereafter, the contents of the input list may be treated as if they were manually entered as criteria of a query.

More advanced users of a database system may wish to use more complex queries than are possible in the standard query screen. In such a case, a user may use a more sophisticated query system, such as the Query Editor. The Query Editor offers advanced query functionality to advanced users. A typical SQL query statement is a SELECT statement, which instructs the database to obtain the various items described in the SELECT statement. A typical SELECT statement includes a WHERE clause and an ORDER BY clause. The format of such a statement may be as follows:

SELECT [desired fields of data] FROM [name of table] WHERE [certain criteria] ORDER BY [sort order]

For example, an exemplary SQL statement may be:

SELECT name, address, city, state, zip FROM customers WHERE state="CA" ORDER BY zip.

This SQL statement would pull the name and address information for every record in the database where the state is CA. The data would be sorted by the data stored in the zip field.

There are various other clauses that may be available for use in a SELECT statement, including HAVING, and GROUP BY.

Figure 3:
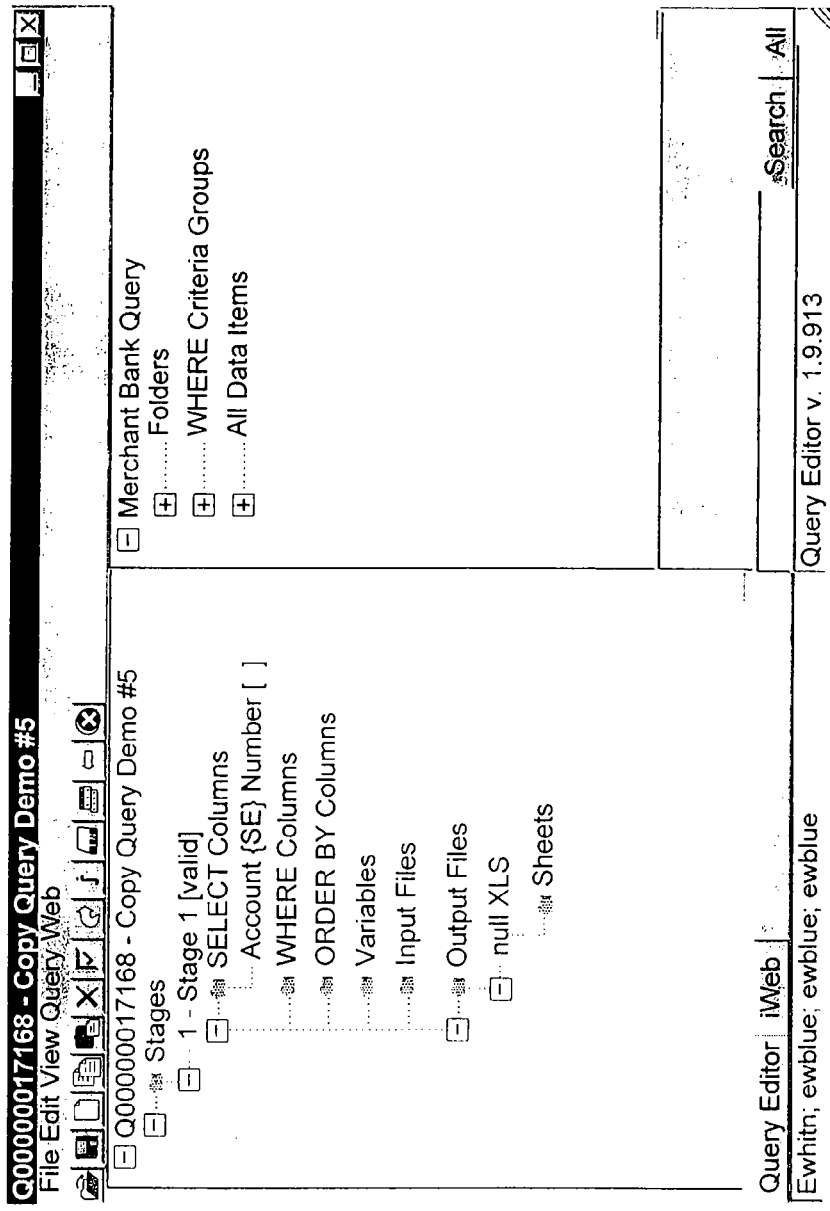
FIG. 3 illustrates an exemplary Query Editor.

The Query Editor provides a method to graphically create such SQL statements. An embodiment of the Query Editor is shown in FIG. 3. On the left pane of the screen is a query tree 302, that shows the basic format of the query. The right pane of the screen contains data tree 304, that contains the possible data items. A user may use a mouse, trackball, or other type of pointing device to drag the desired fields to the query tree. For example, the data tree 304 may contain the field "zip," and the user can drag that field to the "ORDER BY Columns" portion of query tree 302.

Figure 4:
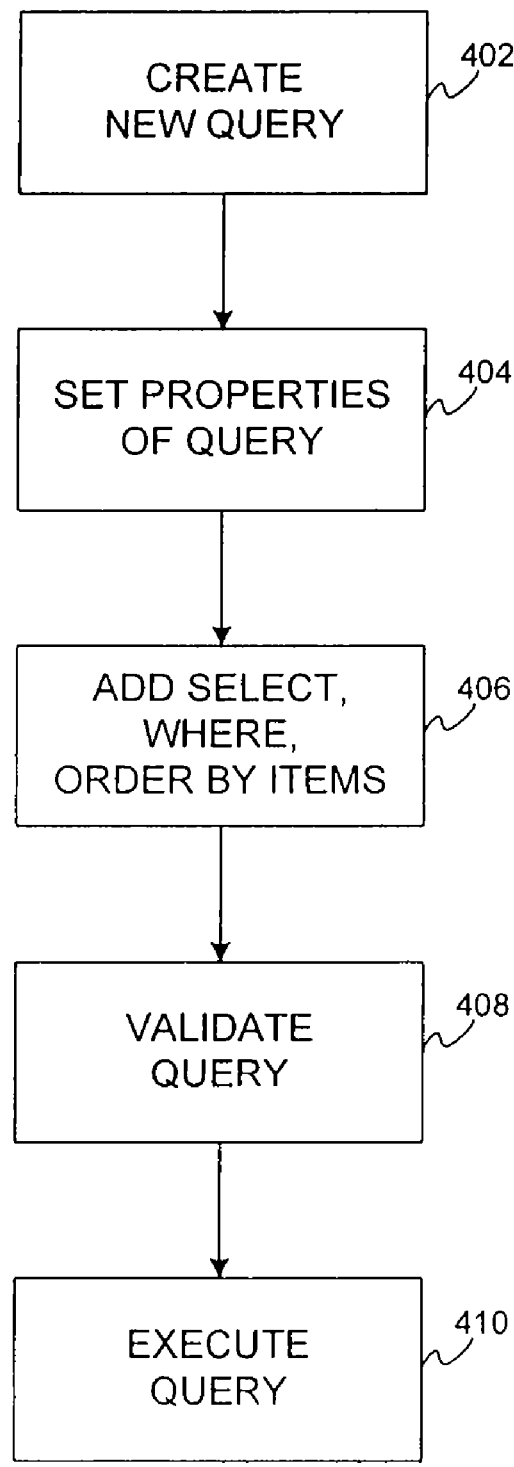
FIG. 4 is a flowchart illustrating the operation of a Query Editor.

The process of creating a query using Query Editor is illustrated in FIG. 4. When a user desires to create a new query (step 402), the Query Editor opens up and the user selects the basic properties of the query, such as the type of query desired (step 404). The user then adds the SELECT, WHERE, and ORDER BY items via the drag-and-drop method described above (step 406). The user can then validate the query (step 408). The query is then executed (step 410). The results may then be transmitted to the user in a variety of different methods.

The validation step may be used because, during the creation of a query, the rules may be temporarily broken. For example, a user may wish to use nested statements that require parentheses. Until the parentheses are matched, the SQL is not valid. However, during the creation of the SQL statement, the user may not be finished entering in the various fields. Rather than constantly monitor the SQL for validity, and generating error messages at every step, in an exemplary embodiment, the validity of the SQL is only checked once the query is ready to be run or at another time specified by the user.

While a query entry system such as that described above can meet the needs for many users, some sophisticated users may desire to manually create SQL statements. Such a manual creation may be desired if one desires to create, for example, columns containing complex calculations or advanced query actions, such as sub-queries and joins. Due to the complexity of such queries, creating such a query using a visual model may not be easily accomplished. Therefore, there may be a desire to enable certain users to manually enter SQL statements.

When the user creates the query criteria using the drag and drop method described above, the SQL of the query is generated and then can be displayed to the user in a separate area of the screen. Thereafter, the user is able to modify the SQL statement or add to the SQL statement.

After the SQL statement has been modified by the user, there is also the ability to validate the SQL statement to ensure that the SQL statement is valid and will find data. An example of the validation process is shown in FIG. 5. Once the field is dragged to the WHERE clause on the query tree, a user can select the field and be brought to the screen shown in FIG. 5. Checkbox 502 allows the user to allow this criteria to be an OR with other WHERE criteria or if the criteria is supposed to be joint. For example, in the statement:

SELECT name FROM table1 WHERE amount>10000 AND state="AZ" all the names in the address database are selected where the state is AZ and the amount in question is over 10000. In contrast, the statement:

SELECT name FROM table1 WHERE amount>10000 OR state="AZ" selects all names from AZ, regardless of the amount, along with all names where the amount is greater than 10000, regardless of the state.

Since each WHERE criteria element can be individually modified, checkbox 502 allows the user to toggle between AND and OR for that particular criteria. Element 504 shows the selected field and element 506 shows the data type of the field. The values of those elements may be changed through the use of drop boxes or the like. Element 508 allows the user to select from various operators via a drop box type selection tool. For example, one may desire data that is equal to a certain value or less than a certain value or greater than a certain value. Element 508 allows the user to select which operator is desired. Element 510 is the data which is being compared to the field. In the example of FIG. 5, a date value of Jan. 1, 2002 is shown. Element 512 allows a comparison between two fields instead of between a field and a predetermined value. Elements 514 and 516 allow the user to nest different WHERE criteria through the use of parentheses. Element 520 shows the portion of the SQL statement that is created by the selected WHERE criteria. Such a generation of SQL has, in the prior art, been invisible to the end users, who may not normally get to view the generated SQL statement. Element 518 is a check box that allows the user to modify the generated SQL statement. A user may wish to modify the generated SQL for a variety of different reasons, such as those discussed above.

The generated SQL statement can be modified by a variety of different methods. For example, the generated SQL statement displayed in element 520 may be a modifiable text box. By placing the cursor at a desired point of element 520, the text within element 520 may be directly modified.

Figure 6:
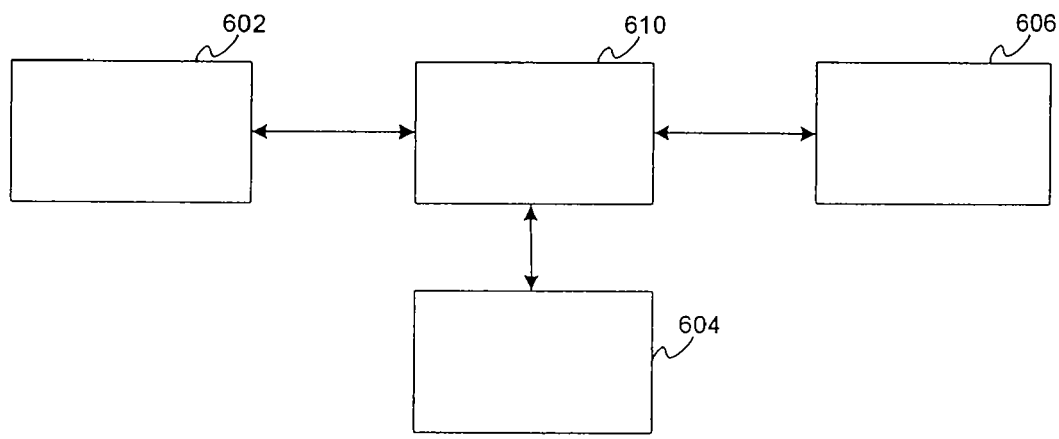
FIG. 6 is a block diagram illustrating a layout of a database system containing an embodiment of the present invention.

An additional aspect of the present invention is the ability to access a variety of different modules which are united using a single user interface. Various possible configurations of such a system exist. For example, with reference to FIG. 6, a database system 600 may include a report module 602, a query module 604, and a survey module 606, all of which may be accessible through a main module 610.

Main module 610 may be configured to present an introduction to database system 600. Main module 610 may provide a description of database system 600, such that new users can determine the functionality of database system 600. Main module 610 may also provide access to the other modules. For example, there may be hyperlinks available from main module 610. Clicking on the appropriate hyperlink will begin execution of the desired module.

Report module 602 may be used to deliver reports and other files in a variety of different formats. Query module 604 may be used to allow users to generate reports on data that meets various criteria defined by the user. Survey module 606 may be configured to allow users to rate the various aspects of the database and associated programs. There are several advantages to such a configuration. The use of a single program to perform the various functions allows a common interface to be used to control multiple programs. The various functions available in the various modules may be easier to learn because they share a common interface.

In addition, report module 602 may be configured to enable the platform-independent, secure publishing, presentation, and retrieval of any file or document. Thus, any type of file may be transmitted using report module 602. In an exemplary usage, a pre-established query may be created and run by a database administrator. The results of the query may be placed in a report file in a pre-determined format. In addition, files of any type may also be placed in a report file and made available for publishing, such as older, legacy data. Furthermore, the results of a user-defined query may also be placed in a report file and made available for publishing.

When a user requests a report or runs a query, the results may be stored in a central location. The results may be made accessible by the user by accessing a virtual InBox, where the user can access all of his requested reports. The InBox may be unique to each user and may be accessible only to the user that requested the query or report. In another embodiment, the results may be located at a predetermined location, such as a specific website or Internet location accessible via the common user interface, such that numerous users are able to access the results. Within the predetermined location, reports may also be arranged via public file groups. In this manner, reports and queries can be created and made available to designated user groups. When a user logs on to the system the user may be able to access certain areas that contain the various public file groups.

Figure 7:
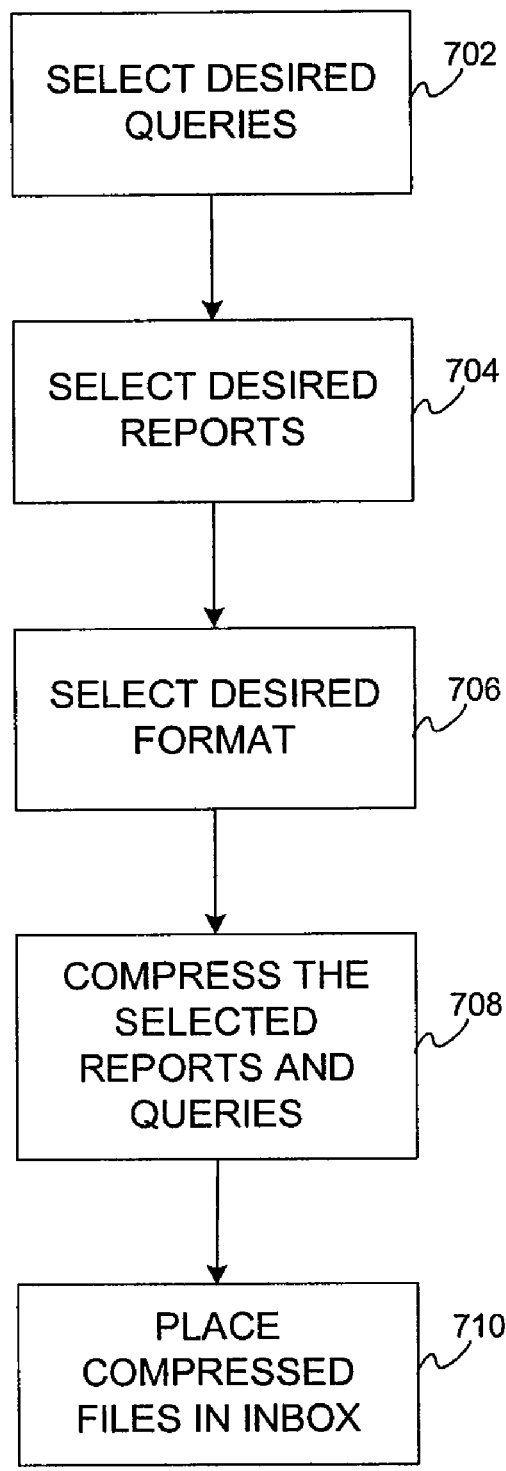
FIG. 7 is a flowchart illustrating the operation of a virtual InBox of the present invention.

With reference to FIG. 7, an exemplary operation of the file delivery system is illustrated. A user selects various queries that he wishes to run (step 702). These queries may be ones that have been created in the past by the user or by others. The user may also select various reports to be delivered (step 704). The reports may be pre-defined reports with pre-determined criteria and pre-determined fields that were searched. Reports may be executed by a database administrator to generate files containing commonly used data or regularly updated data. The user then selects the format for receiving the reports and queries (step 706). This action may be performed after the user has selected all of the reports and queries and other files he desires. In the alternative, this action may be performed at the selection of each query and report. There may be a variety of different formats that may be available, such as various database formats, spreadsheet formats, text file formats, and the like. Once all of the desired reports and queries are selected, they can be compressed (step 708). For example, the ZIP format allows multiple files and directories to be compressed and placed into a single file with a .ZIP extension. In the alternative, other file compression formats, now known or known in the future, may be used. The compression step allows files to be transmitted in a shorter period of time, due to the smaller size of the compressed files. This compression step typically occurs on the centralized computing system where the database is stored. The selected files are compressed, using one of a variety of different methods. The report and query files or single compressed file are then made available from the InBox or placed in a centralized location (step 710). The InBox may be configured as a standardized area where the desired reports are placed. Once a user logs on to the database system, the user is able to access the InBox or centralized location and download the requested files. In the alternative, the files or single compressed file may be sent via e-mail to an address designated by the user.

One particular aspect of the reporting function is the use of "data periods." A typical report may have a period of time that is covered in the report. For example, a report may contain data that is updated on a weekly basis. Thus, the report may be automatically updated with the correct information every week. In addition, every weekly report would be automatically saved for archival purposes.

In addition, an embodiment of the present invention may output a variety of different report files. For example, a report may be considered a collection of report files that relate to a specific question. For example, a report may contain both a summary report file and a detailed report file, that each encompass the same data and data period. Thus, when a report is requested by a user, there may be multiple report files created that display the information in a variety of different manners.

The present invention is described herein with reference to block diagrams, flowchart illustrations of methods, systems, and computer program products according to various aspects of the invention. It will be understood that each functional block of the block diagrams and the flowchart illustrations, and combinations of functional blocks in block diagrams and flowchart illustrations, respectively, may be implemented by computer program instructions. These computer program instructions may be loaded on a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded on a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention.

Benefits, other advantages, and solutions to problems have been described above with regard to specific embodiments. No element described herein is required for the practice of the invention unless expressly described as "essential" or "critical".

The invention claimed is:

1. A method for creating a stored query for remotely accessing information comprising:
   receiving, at said computer, a selection of a query type, wherein said query type corresponds to a query template;
   receiving, at said computer, a query field and query criteria, wherein said query criteria is selected from an input list having a profile and stored at said computer;
   creating, at said computer, said query field, said query criteria, and said query type into a Structured Query Language (SQL) statement;
   executing, by said computer, said SQL statement to add said query field and said query criteria to said query template;
   creating, by said computer, said stored query based on said query template, wherein said stored query is stored in a query database;
   executing, by said computer, said stored query to create a first file;
   categorizing, at said computer, said first file such that it is available to a pre-determined group of users;
   placing, by said computer, said first file in a location accessible to said pre-determined group of users,
   communicating, by said computer, with an intermediary device, wherein said intermediary device:
      remotely obtains access data including location information and authentication credentials, wherein said access data is used to locate and at least one of: grant and deny access to said secure system, using a device of one of said pre-determined group of users;
      transmits said access data to said secure system;
      receives a validation of said access data from said secure system; and,
      allows said access to said secure system; and
   performing, by said computer, an analysis of said query database, wherein said analysis is based on performance data resulting from execution of said stored query on a database, and wherein said analysis determines at least one of: database fields that are queried least often and database fields that are queried most often.

2. The method of claim 1, further comprising:
   generating a second file;
   compressing said first file and said second file;
   placing a result of the compressing step into a third file;
   categorizing said third file such that it is available to said pre-determined group of users; and,
   placing said third file in a location accessible to said pre-determined group of users.

3. The method of claim 1, wherein said first file is accessible by way of and Internet connection or an inbox within a user interface.

4. The method of claim 1, wherein said predetermined group of users is based on validating authentication credentials of each of said predetermined group of users at said intermediary device.

5. The method of claim 2, wherein at least one of said first file, said second file, and said third file includes a query used to compile data from a defined data period.

6. The method of claim 2, wherein at least one of said first file, said second file, and said third file is platform independent.

7. The method of claim 1, further comprising sending said first file to said pre-determined group of users by way of at least one of email, web page, facsimile, text message, and postal service.

8. The method of claim 1, further comprising receiving formatting instructions for said first file.

9. The method of claim 2, wherein at least one of said first file and said second file comprises a plurality of reports.

10. The method of claim 1, further comprising receiving a request from one of said pre-determined group of users, wherein said request is to at least one of: access data, modify data, and delete data relating to said first file.

11. The method of claim 1, further comprising receiving a query from one of said pre-determined group of users, wherein said query is executed at said location of said first file.

12. The method of claim 1, further comprising transmitting access data to a device of one of said pre-determined group of users in the form of a file, wherein said device obtains access credentials corresponding to said location of said first file.

13. The method of claim 1, wherein access to said first file is based on a type of device.

14. The method of claim 1, further comprising updating said first file based on generating a second file using data from a data period within said database.

15. The method of claim 1, further comprising generating a plurality of files based on a plurality of data periods within said database, wherein each of said plurality of files maintain corresponding data fields.

16. The method of claim 1, further comprising:
receiving a request to retrieve said input list;
providing said input list;
saving said query template within a first record of a query database;
receiving a selection of said stored query;
executing said stored query against said query database; and, saving said stored query in a second record of said query database.

17. The method of claim 1, further comprising:
receiving a request to access said location to retrieve said first file;
transmitting said first authentication credentials to an intermediary program on a client computer, wherein said intermediary program:
authenticates said request;
retrieves a connection file based on said authenticating of said first authentication;
retrieves connection data from said connection file;
providing access to a server based on said connection data, wherein said client computer retrieves said first file from said location at said server.

18. A computer-readable memory tangibly embodying a program of instructions executable by a machine, said plurality of instructions comprising:
instructions to receive a selection of a query type, wherein said query type corresponds to a query template;
instructions to receive a query field and query criteria, wherein said query criteria is selected from said an input list having a profile;
instructions to create said query field, said query criteria, and said query type into a Structured Query Language (SQL) statement;
instructions to execute said SQL statement to add said query field and said query criteria to said query template;
instructions to create a stored query based on said query template, wherein said stored query is stored in a query database;
instructions to execute said stored query to create a first file
instructions to categorize said first file such that it is available to a pre-determined group of users;
instructions to place said first file in a location accessible to said pre-determined group of users; and,
instructions to communicate with an intermediary device, wherein said intermediary device:
remotely obtains access data including location information and authentication credentials, wherein said access data is used to locate and at least one of: grant and deny access to said secure system, using a device of one of said pre-determined group of users;
transmits said access data to said secure system;
receives a validation of said access data from said secure system; and,
allows said access to said secure system; and
instructions to perform an analysis of said query database, wherein said analysis is based on performance data resulting from execution of said stored query on a database, and wherein said analysis determines at least one of: database fields that are queried least often and database fields that are queried most often.

* * * * *